United States Patent [19]
Valenzano

[11] 3,992,834
[45] Nov. 23, 1976

[54] EXTRUDABLE CONSTRUCTION FORMS

[75] Inventor: Marcello Valenzano, Flushing, N.Y.

[73] Assignee: ABCO FAB Building Systems & Licensing Co., Flushing, N.Y.

[22] Filed: Feb. 19, 1975

[21] Appl. No.: 550,977

[52] U.S. Cl. .............................. 52/220; 52/284; 52/314; 52/594
[51] Int. Cl.² .................. E04C 1/39; E04C 2/52
[58] Field of Search ............. 52/220, 589–594, 52/567, 569, 286, 284, 285, 314, 561–572, 608, 221

[56] References Cited
UNITED STATES PATENTS

| | | | |
|---|---|---|---|
| 1,168,583 | 1/1916 | Volz | 52/589 |
| 1,255,761 | 2/1918 | Lenkerd | 52/314 |
| 1,451,340 | 4/1923 | Kroonen | 52/567 |
| 1,583,921 | 5/1926 | Garber | 52/220 |
| 3,906,665 | 9/1975 | Medlin | 52/284 |

FOREIGN PATENTS OR APPLICATIONS

| | | | |
|---|---|---|---|
| 771,283 | 7/1934 | France | 52/593 |
| 907,800 | 7/1945 | France | 52/286 |
| 614,266 | 12/1960 | Italy | 52/568 |
| 377,295 | 12/1939 | Italy | 52/593 |
| 443,072 | 12/1948 | Italy | 52/594 |
| 448,922 | 1/1954 | Italy | 52/594 |
| 5,522 | 1827 | United Kingdom | 52/608 |

*Primary Examiner*—James L. Ridgill, Jr.

[57] ABSTRACT

This invention relates to extrudable construction forms which in combination with each other produces prefabricated structures such as walls, floors, roofs for homes, commercial buildings and other structures.

9 Claims, 6 Drawing Figures

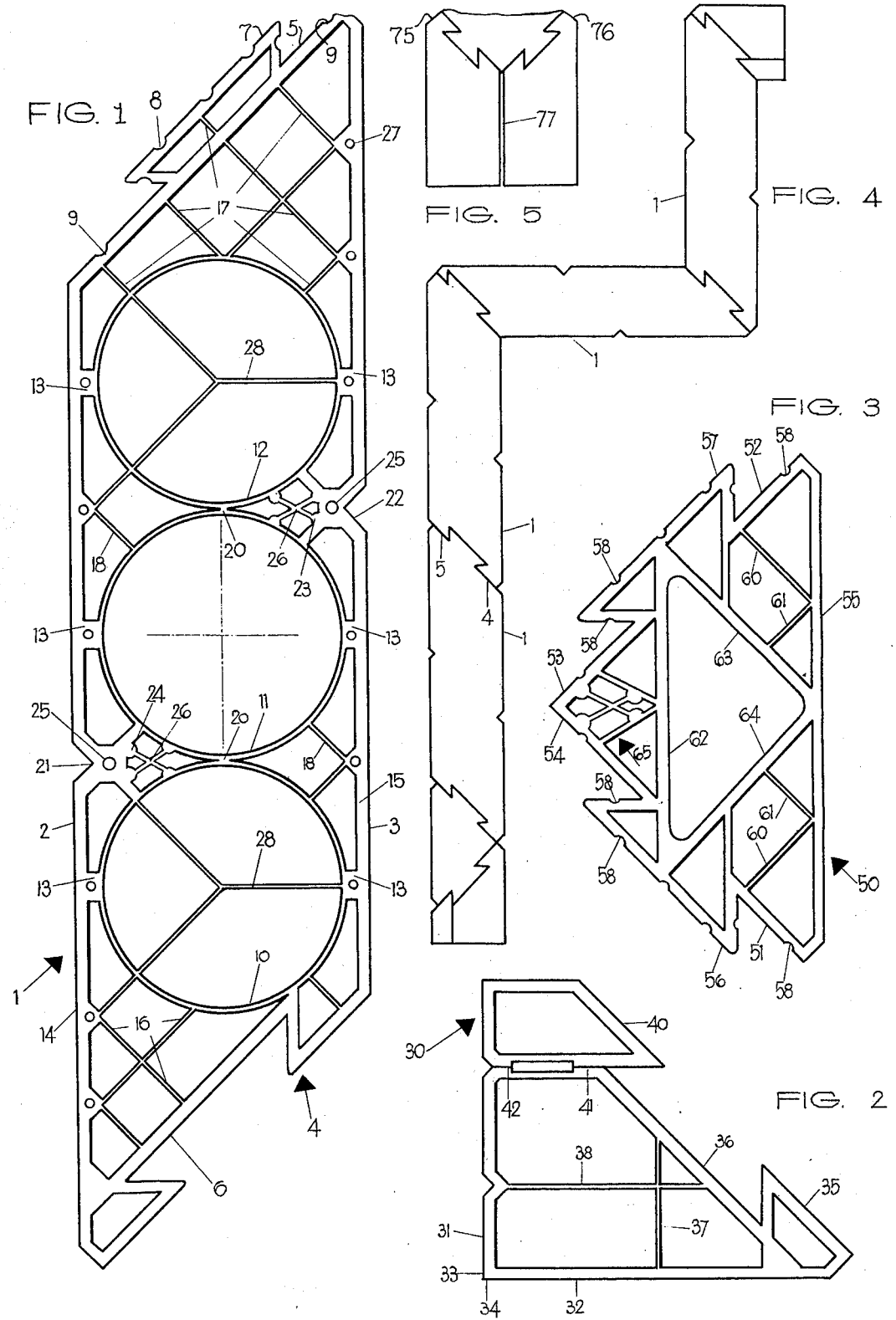

EXTRUDABLE CONSTRUCTION FORMS

Construction forms comprised essentially of three interlocking self-aligning extruded structural elements in the form of finished shapes that provide built-in functional features and include such additional conduits structural supports, interior-exterior finished surfaces, corner trim, joining pieces, framing, continuous V-grooving, insulation, ducts, vapor barriers and other elements of construction.

In the construction industry generally, fabrication and repair usually takes place on site be it new construction or the repair of existing structures. On site erection of new and repair building elements in a costly and time-consuming affair involving skilled craftsmen and favorable weather elements, not least being the availability of men and materials. To alleviate these difficulties and decided shortcomings, it is contemplated by the invention embodied in the instant disclosure to provide a system of utilizing a combination of novel structural forms of elements assembled in a manner to give the effect of a completed unique structure such as a building, wall, floor, roof and etc.

The structural forms comprises in the main three structural extruded elements each being capable of being interlocked with the other in a prearranged design array and that a plurality of these completed designed arrays are assembled to form a completed structure such as a building wall and etc. The form or elements themselves are each configured to have male and female slotted tongue and groove extremities so that the extremity of each element has a male-female slot arrangement for purposes of forming a continuous unitary wall structure when assembled. Other forms are also arranged so that instead of having a continuous planer wall, a 90 degree turn may be effected. The structural elements themselves are each disposed to have therein reinforcing elements in the form of crossbars and triangular or tubular conduits so arranged as to enhance the feasibility of having placed therein structural strength insulation, plumbing and electrical wiring without the need for providing these features by other means and arrangements.

Further, the elements which may be made of plastic, aluminum and etc., are capable of being thermally extruded in the normal manner with conventional extruding machinery. It is also possible to provide machine means in which separate grades and types of plastic may be applied to the machine to assure that the exterior and interior walls of the forms have different finishes and that the internal reinforcing elements would be of a different grade. Any combination of plastics can be the object of the extruding process to assure that the structural element has the proper combination to assure the required configuration and diverse functions.

It is therefore a principal object of the invention to provide novel construction elements for erecting structures that are economical to make, package, transport and easy to assemble for on-site outdoor or indoor construction.

Another object of the invention is to provide construction elements that incorporate simple access for electrical wiring, plumbing, insulation and other functional elements.

Another object of the invention is to provide structural elements that are capable of being extruded in a manner as to have each of the respective parts of said element made of some type of plastic to simulate finish, strength and thermal characteristics.

A still further object of the invention is to provide structural elements that can be easily assembled so as to obviate the need for skilled articians and/laborers.

A still further object of the invention is to provide a 45° mitre which can be transversed 180° to align in a different configuration - ex. (90° or 180°).

A still further object of the invention is to provide self-contained components which do not require the addition of any other elements such as insulation, conduits, structural elements and etc.

Further objects and advantages will become readily apparent from a reading of the specifications herein and a study of the accompanying drawings, and wherein FIG. 1 shows an elevational view of an extruded panel enclosure according to the invention.

FIG. 2 shows an interlocking end section according to the invention.

FIG. 3 shows an elevational view of an intermediate section according to the invention.

FIGS. 4 and 5 shows an elevation assemble structure using different panels, and

Figure 6:
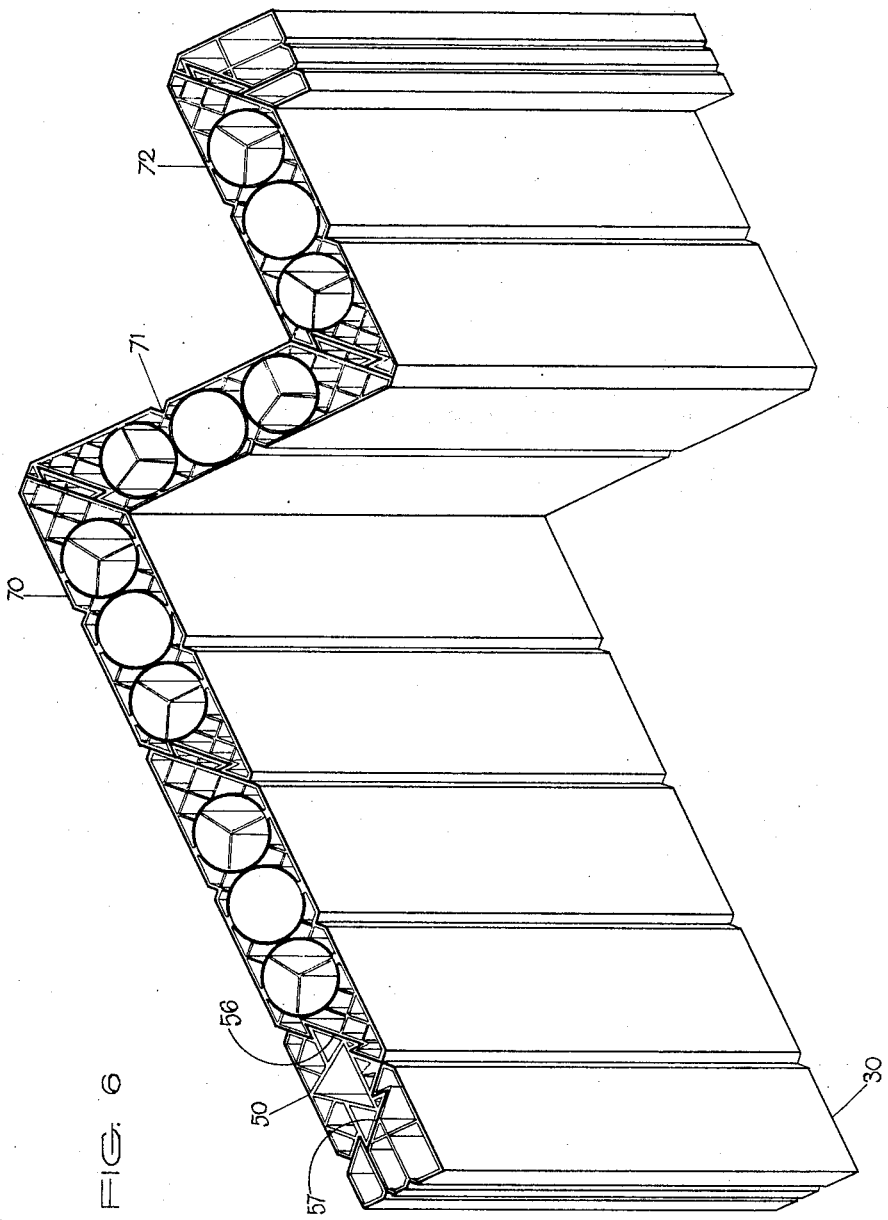
FIG. 6 shows in perspective an assembled wall structure utilizing a plurality of structural elements as shown in FIGS. 1, 2 and 3.

In describing the invention as depicted by the various drawings and to better facilitate an understanding thereof, the same parts will have assigned thereto the same reference number. Now describing the invention with respect to the various FIGURES, there is shown in FIG. 1 an interlocking panel or structural element 1 comprised of spaced-apart elongated parallel sides 2 and 3 with said sides being terminated in beveled end sections 4 and 5 so that the completed enclosure is generally configured in rhombic form.

End section 4 is disposed to having a slotted recess or groove 6 dove-tailed in shape and further disposed to receiving in slidable engagement an interlocking tongue 7 mounted to end section 5 and configured to match the shape of said slotted recess 6. In a plurality of said panels the tongue and groove arrangement of each panel is notched to each abuting panel to form a continuous assembled wall structure. The tongue portion of the panels each have on their engaging surfaces a series of channels 8 for purposes of permitting smooth engagement during assembly of panels and for application of a lubricant, sealant or some other bonding agent. Also, the engaging surface of end section 5 includes additional channels or indents thereon similar in shape or form as channels 8 and for the same purpose as aforementioned.

The structural element of panel 1 includes therein a plurality of elongated tubular elements 10, 11 and 12 running parallel to and for the length of the panel sides 2 and 3 and structurally supported by brackets 13 each of which is connected to the panel wall interiors 14 and 15. The tubular elements are further supported by a plurality of cross-bars 16 for tubular element 10, cross-bars 17 for tubular element 12 and cross-bar 18 for tubular element 11. Tubular element is further strengthened by its abutment position 20 between elements 10 and 12. It may be appreciated that the tubular elements 10, 11 and 12 are arranged and structured so as to carry various types of plumbing elements as well as various types of fluids in the form of gas and/or liquids or for that matter various types of materials such as foam insulation and other types of insulating materials, wiring or tubing.

The panel 1 contains a continuous elongated V-shaped groove 21 and 22 running the length of the panel, the trough of each groove terminating in truss-like sections 23 and 24 each residing between the tubular elements 11 and 12 and 10 and 11, respectively. The trussed sections are arranged to include vent holes 25 for purposes of adding structural strength to the panel, and a series of supporting cross-bars 26. Thus the truss-like sections provide not only structural strength to the panel as well as support for the tubular sections, but also means for receiving externally any fastener that has been placed into the panel through the groove. It may be appreciated that the tubular sections, the supporting structural brackets and truss-sections along with the panel element itself may be extruded as a single integrated and solid complete unit. That each of the respective parts making up the whole may be made up from different types of plastic each having its own particular function, strength and thermal characteristics. Further, during the extruding process special vent holes 25 provide for cooling of the outer panel surfaces thereby maintaining a uniform exterior surface and thereby avoiding surface shrinkage wherever a greater exterior wall thickness exists. Additional vent holes 27 are included along the panel surface for the above stated purpose.

Tubular elements 10 and 12 further include reinforcing ribs 28 which are so disposed as to be an integral part of said tubular elements during the extrusion process. The use of said ribs provides more rigidity and strength to the panel to assure a wall structure capable of performing the functions intended.

FIG. 2 shows an extruded elongated triangularly configured panel enclosure 30 used as an end section and designed as to form a termination for the panel 1 of FIG. 1 when placed in operable assembly therewith to form a panel array to complete some given structure such as a wall, floor, ceiling and the like. In particular the end panel 30 comprises a pair of wall members 31, 32 each having an extremity thereof 33, 34 attached to each other at right angles, the other extremity of each wall terminating in a third side 35. The third side includes a female groove 36 comparable in form and size to that shown with respect to the groove 6 of FIG. 1. The walls of said panel 30 are stiffened and supported by cross-beams 37, 38. The completed panel 30 is extruded as a single solitary integrated unit. The panel also includes an additional corner section 40 held to the panel proper by the extrusion process, but which can be removed or severed along the line 41, 42. This corner section 40 may be used as an independent inside corner strip molding or other trim or decorative function. The removal of said section may also be used as an insert for a window, panel or door when the remaining corner section is set into a panel section.

There is shown in FIG. 3 another extruded elongated triangularly configured panel enclosure 50, used as an intermediate section and so designed as to facilitate proper terminations for the main panels to be described. In particular, the said panel 50 includes a pair of wall members 51, 52 each having an extremity thereof, 53, 54 attached to each other at right angles, the other extremity of each wall terminating in a third side 55. Each of the said wall members 51, 52 further includes interlocking tongues 56 and 57, respectively, each comparable in size, shape and function as interlocking tongue 7 mounted to end section 5 in FIG. 1. The interlocking tongues 56, 57 are each configured to suitably engage the dove-tail grooves 2 of FIG. 1 and 36 of FIG. 2. The tongues 56, 57 as well as the slides 51 and 52 have small channel-like indentations 58 disposed on their engaging surfaces, or those surfaces arranged to interlock with surfaces of abutting panels in the process of producing an assembly and array of panels to build up or erect a given structure. The indentation permits the free flow of sealants and lubricants to effect smooth movement of the panels and firm sealing thereafter. The walls 51, 52 and 53 are supported and stiffened by a complex of cross-braces 60, 61 and beams 62, 63 and 64 and also a system of braces 65 which strengthened the right-angled corner in which walls 51 and 52 terminate in. Here again the intermediate panel 50 is an extruded integrated singular structure in which all sides, walls, structural support brackets, braces and etc., form a single part or unit, thus assuring a solid reinforced panel.

FIGS. 4, 5, and 6 illustrate how, utilizing the extruded panel forms defined by FIGS. 1, 2 and 3, a structural configuration is possible. In the said FIGURES several interlocking panels 1 are each joined to each other at their extremities so that the male and female elements forming the interlock parts are each engaged to form a continuous wall structure. In particular the tongue 7 and groove 6 interlock features of the panel are each disposed to slidably engage each other at the extremities of successive abutting panels to form a continuous wall shown particularly in perspective in FIG. 6. FIG. 4 shows each abutting panel terminates in a groove which is comparable to the grooves 21, 22 at intermediate points of the panel to give the effect of a sinvle wall panel. Further, it is possible to arrange the panels so that instead of forming a single continuous wall that a wall may be constructed to have one or more 90 degree directions. This is done by merely rotating a panel a full 180 degrees from that which produced the single continuous wall structure. This is shown in FIG. 5 where panels 70, 71 and 72 are so connected as to produce the right-angle directional effect.

Intermediate panel 50, shown in FIG. 3, having two male elements 56, 57, may be used to connect two female elements, one on a regular panel 1 and the other on an end panel 30 so as to form a single continuous wall as shown in FIG. 5. Termination panel 30, as shown in the said FIG. 5, may be used to terminate a walled panel structure in the same direction as the panel or at right angles thereto.

FIG. 5 shows an intermediate panel section 50 connected to the female ends of regular panel section 1 to form a double wall panel section. The panel terminations 75, 76 form beveled corners which have certain esthetic values. The thin space 77 between the panels can be used for a vapor barrier (foil) sealant, bonding or for some other meaningful function. Referring to the various FIGURES, the V-grooves 21, 22 along the center of both exterior sides of the first panel 1 divides both exposed sides in half to create two equal V-groove face modules. Also opposing ends of the panel 1 have singular opposing corners 8a and 8b beveled at 45° angles. The beveled corners 8a and 8b blend with abutting panels to take on the form of the V-grooves 21, 22 to give the impression of a continuous wall or panel structure as shown in FIG. 4, part a and b.

Intermediate panel FIG. 3 also includes beveled corners 58a and 58b comparable to bevel corners 8a and 8b of FIG. 1 so that the attachment of the intermediate panel to the elongated panel, as shown in FIG. 4 again creates the illusion of a continuous wall structure as shown as part c and d.

Again, as shown in FIG. 2, the end panel includes a beveled corner 32a comparable to the beveled corners of FIGS. 1 and 3 to give the illusion of a continuous wall as shown in FIG. 4.

All of the above beveled parts are so designed to create the illusion of V-grooves that are not jointed together, but that in effect overlapping takes place as soon in the various FIGURES. The configuration of the V-groove in abutting sections, as shown in FIG. 4, is such that a diagonal overlapping of the V-groove surfaces takes place. This overlapping eliminates the exposed open joint and creates a reveal in which only one straight line surface is exposed thus eliminating two abutting side-by-side straight corners. Two abutting side-by-side pieces without a reveal have a tendency to magnify every little imperfection along the exposed V-groove joint surfaces.

FIG. 6 shows the assembled panel structure and particularly demonstrates the V-grooves with no reveals, and the elongated tubular elements running the length of the panel and in parallel therewith.

It may be appreciated that because of the beveled corners above indicated, that as shown in FIG. 6, the abutting straight panels terminate in V-grooves 72a indicating clean lines and no reveals, and at right-angle wall terminations the bevel corners terminate in a single line 72b with no apparent reveal.

All of the beveled corners and end sections have 45° configurations and as such all of the panels may be rotated and reversed as shown in the respective drawings to give continuous or angular wall configurations.

While the invention has been described and illustrated with respect to certain preferred embodiments which give satisfactory results, it will be understood by those skilled in the art, after understanding the principle of the invention, that various changes and modifications may be made without departing from the spirit and scope of the invention, and it is intended therefore in the appended claims to cover all such changes and modifications.

Having defined the invention, what is claimed is:

1. Construction forms for the erection of structural assemblies utilizing three extruded interlocking building panels assembled in a pre-arranged array and wherein the panel array comprises,
   a. a first extruded panel enclosure consisting of a pair of spaced-apart, intermediate V-grooved side walls, including beveled corners thereof structurally supported by conduit means therebetween, bracket means between said walls and elongated conduit means running the length of said panels for structurally stiffening said panel walls and conduit means and 45° beveled end walls terminating said enclosure including attaching means thereon for attachment to abutting panels,
   b. a second extruded end panel enclosure configured as a right angle and includes a pair of walls each terminating at one extreme at right angles to each other and the other extremes, one including a beveled corner, terminating in a third wall, said third wall having attaching means thereon for attachment to abutting panels, the said walls each being structurally supported by cross-beam therebetween, and
   c. a third extruded intermediate panel enclosure configured as a right angle and includes a pair of walls each terminating at one extreme at right angles to each other and the other extreme, including beveled corners, terminating in a third wall, and wherein each of said walls comprising the pair have thereon attaching means for attachment to abutting panels, the said walls each being structurally supported by cross-beam means therebetween, and
   d. wherein each of the respective panels are disposed to, when attached at their extremities, to form the completed pre-arranged assembly, present a continuous structural assembly with no apparent reveals at the abutting extremities of said panels by virtue of the beveled terminations of said panels.

2. Construction forms for the erection of structural assemblies according to claim 1 and wherein said conduit means include round elongated tubular members for carrying materials such as fluids, piping, insulation and wiring.

3. Construction forms for the erection of structural assemblies according to claim 1 and wherein said end walls further include terminating grooves for purposes of simulating panel intermediate grooves to give the effect of a continuous wall.

4. Construction forms for the erection of structural assemblies according to claim 1 and wherein said panel attachment means further includes sealing means disposed to permit rapid assembly and firm bonding of said panels.

5. Construction forms for the erection of structural assemblies according to claim 1 and wherein said first panel and walls attaching means comprises a tongue on one wall and a groove on the opposite wall each arranged to permit interlocking engagement with an abutting panel so as to form a single continuous wall, or to permit one panel to abut at right angles to the next panel.

6. Construction forms for the erection of structural assemblies according to claim 1 and wherein said extruded end panel attaching means includes a groove structured to engage the attaching means of the said first and third elongated panels to form a termination of the structural assembly.

7. Construction forms for the erection of structural assemblies according to claim 1 and wherein said bracket means between said walls and conduit means comprises reinforced cross-braces and further disposed to receiving nails, screws and other fasteners and the securing thereof.

8. Construction forms for the erection of structural assemblies according to claim 1 and wherein said third extruded intermediate panel attaching means includes tongue elements structured to engage the attaching means of said first and second elongated panels to facilitate the continuance of panels or to direct the wall panels at right angles to each other.

9. Construction forms for the erection of structural assemblies according to claim 8 and wherein said intermediate panel tongue is further disposed to terminate a pair of wall panel members to effect a double wall structure assembly.

* * * * *